A. H. TAYLOR.
METER.
APPLICATION FILED MAY 8, 1908.

934,107.

Patented Sept. 14, 1909.
2 SHEETS—SHEET 1.

Witnesses:
M. Gruber
F. George Barry

Inventor:
Albert H. Taylor
By Brown & Seward
his Attorneys

A. H. TAYLOR.
METER.
APPLICATION FILED MAY 8, 1908.

934,107.

Patented Sept. 14, 1909.
2 SHEETS—SHEET 2.

Witnesses:
M. Ginsberg
F. George Barry

Inventor:
Albert H. Taylor
By Brown & Seward
his Attorneys

UNITED STATES PATENT OFFICE.

ALBERT H. TAYLOR, OF EASTON, PENNSYLVANIA, ASSIGNOR TO INGERSOLL-RAND COMPANY, OF NEW YORK, N. Y., A CORPORATION OF NEW JERSEY.

METER.

934,107.  Specification of Letters Patent.  Patented Sept. 14, 1909.

Application filed May 8, 1908. Serial No. 431,613.

*To all whom it may concern:*

Be it known that I, ALBERT H. TAYLOR, a citizen of the United States, and resident of Easton, in the county of Northampton and State of Pennsylvania, have invented a new and useful Meter, of which the following is a specification.

My invention relates to meters and more particularly to a meter for measuring the volume of air or other gas flowing through a pipe line.

The present embodiment of my invention is designed for the purpose of accurately gaging the flow of air or gas by the displacement of a known volume of water and is particularly well adapted for use in testing machines operated by compressed air.

This device is intended to overcome any unreliability or inaccuracy attendant upon the use of gears operated by a motor where large volumes and high pressures are used and close readings are desired.

Figure 1:
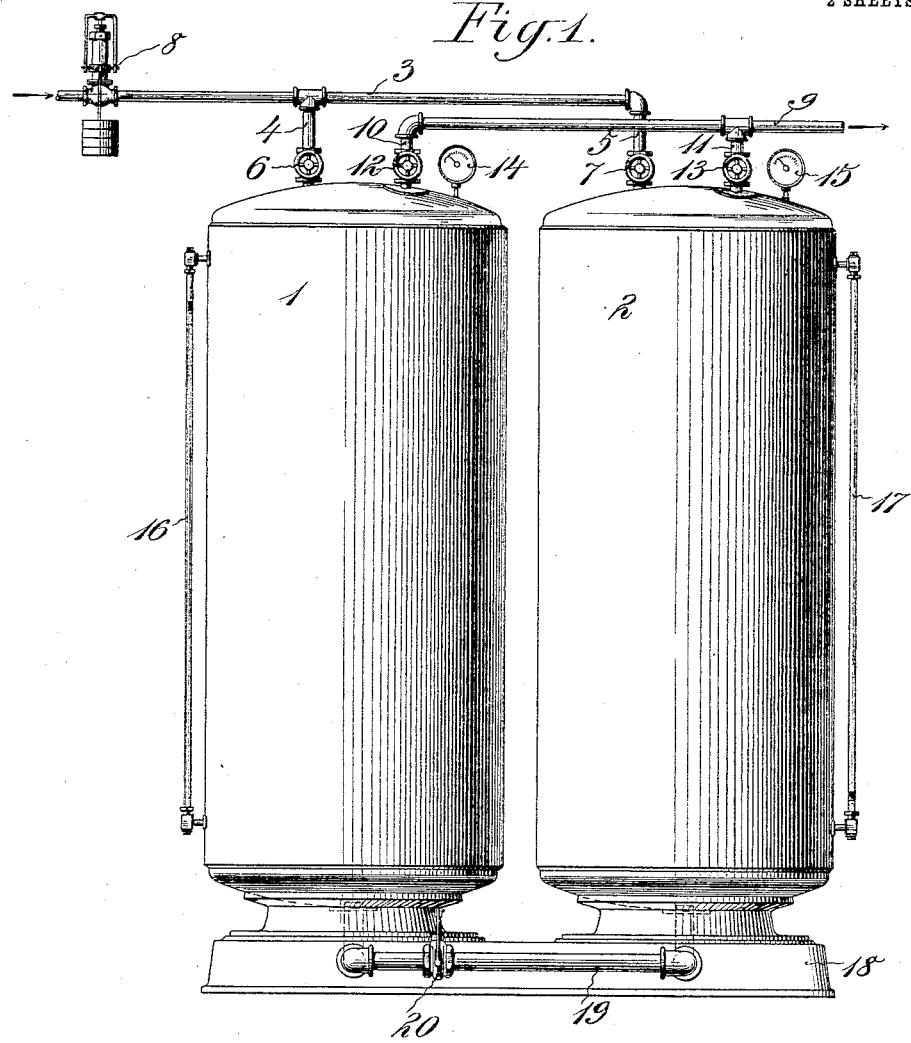
Figure 2:
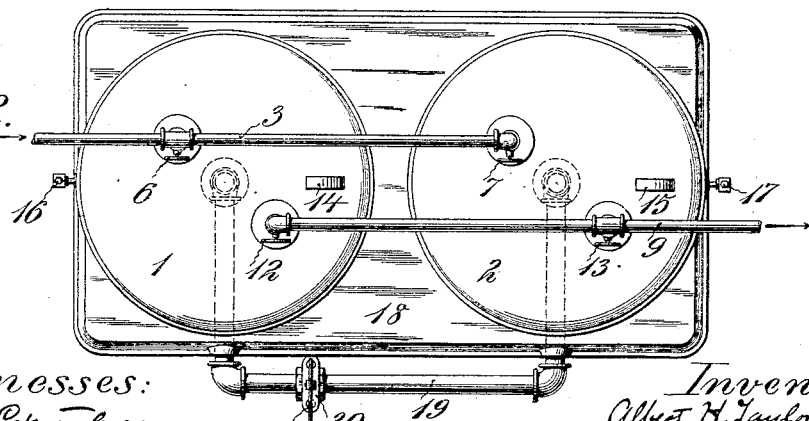
Figure 3:
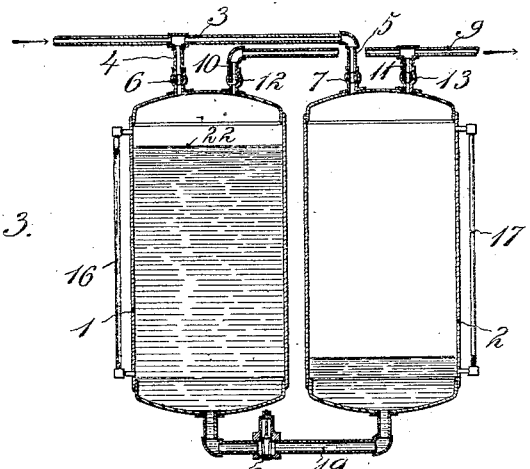
Figure 4:
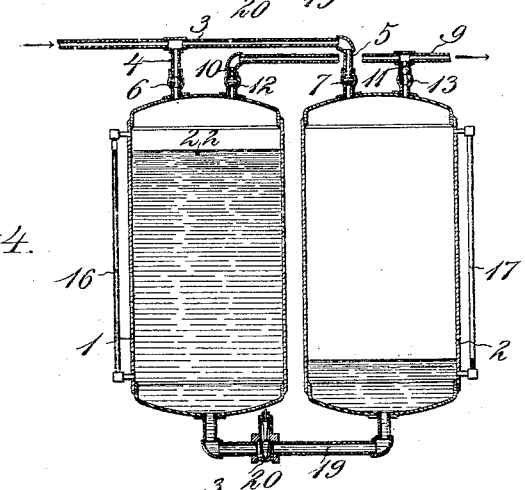
Figure 5:
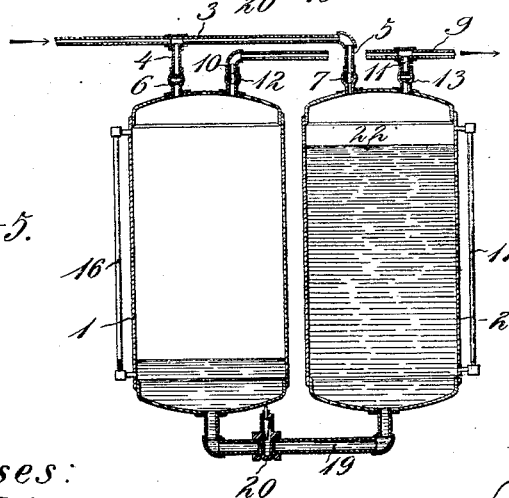

In the accompanying drawings, Figure 1 is a view of a meter in side elevation, Fig. 2 is a top plan view, and Figs. 3, 4 and 5 are diagrammatic views showing the different positions of the valves and the changed positions of the liquid during the operation of the meter for testing purposes.

In the form illustrated, the meter comprises two vertical cylinders 1 and 2 connected at their tops with a source of supply of compressed gas or air by a pipe 3 and branch pipes 4 and 5, the branch pipe 4 connecting with the top of the cylinder 1 and the branch pipe 5 with the top of the cylinder 2. The pipe 4 is provided with a valve 6 and the pipe 5 with a valve 7. The pipe 3 is also conveniently provided with a reducing pressure valve of any well known or approved form indicated at 8. The tops of the cylinders 1 and 2 are also connected with an outlet pipe 9 by means of branch pipes 10 and 11, the branch pipe 10 being provided with a valve 12 and the branch pipe 11 with a valve 13. The pipe 9 leads to the machine which is to be tested in respect to its consumption of compressed air or gas. The cylinder 1 is provided with a pressure gage 14 and the cylinder 2 with a pressure gage 15. The cylinder 1 is also provided with a gage glass 16, in communication with the cylinder 1 near its upper and lower ends, and the cylinder 2 is provided with a gage glass 17, in communication with the cylinder 2 near its top and bottom. The cylinders 1 and 2 are conveniently supported upon the base 18 and are placed in communication with one another at their lower ends by a pipe 19 provided with a valve 20, which valve should be of a quick opening type, for example, a gate valve, in the present instance provided with a lever 21 for permanently operating it. The pipe 19 is made of sufficient size to permit a free flow of the liquid from one cylinder to the other when the valve 20 is opened and the valve 20 is preferably of such a nature as to leave the interior of the pipe for the most part unobstructed when it is open.

The amount of liquid, for instance water, within the two cylinders may be a little more than what is required to fill one of the cylinders so that when one cylinder is full the other cylinder and the connecting pipe may have a little showing at its bottom. This liquid is indicated in the diagrammatic view by 22.

The pressure gages are omitted in the diagrammatic views but it is to be assumed that they are present the same as shown in Figs. 1 and 2.

In operation, the reducing pressure valve 8 having been set to the desired degree for the purposes in hand and the machine connected with the outlet pipe 9 having been throttled; and assuming the liquid 22 to occupy the position shown in Fig. 3 in the two cylinders, the valves 6, 7, 12 and 13 are opened as shown in Fig. 3, and the valve 20 closed. The air or gas will now flow unobstructed through the two cylinders above the surface of the liquid therein until the pressure gages 14, 15, show an equal pressure in the two cylinders. The valves 12 and 7 may now be closed, the throttle valve of the machine to be tested open and then the valve 20 quickly opened. The compressed air or gas will now force the liquid 22 down in the cylinder 1 and up in the cylinder 2, the supply of air or gas for the machine being taken from above the liquid in the cylinder 2 and this may proceed for a determined length of time, for example, any time less than that required to lower the liquid in the cylinder 1 below the bottom of the gage glass and at the termination of such test time the gate valve 20 may be promptly closed and the valves 12 and 7 opened to permit the machine to go on with its work from a supply directly through the cylinders above the liquid therein.

By knowledge of the capacity of the cylinders and an accurate measurement of the distance which the liquid has been depressed within the cylinder 1 during the time the test continued, the exact volume of air or gas transmitted to the machine during the time of test may be determined. A second test may then follow by closing the valves 6 and 13 and opening the gate valve as shown in Fig. 5, thereby causing the liquid to be depressed in the cylinder 2 and the gas or air furnished to the machine from above the liquid in the cylinder 1, the fall of the liquid in the gage glass 17 being noted until the fall is arrested by the closing of the valve 20 and opening of the valves 6 and 13 to permit the continued action of the machine by a supply of air and gas directly through the cylinders above the surfaces of the liquid therein.

The machine is simple and will render an accurate account of the amount of air or gas used under a predetermined pressure and the test may be made by one who is an adept in handling the valves without interfering with the continued action of the machine under test.

What I claim is:—

1. A meter comprising a plurality of closed vessels, a valved connection at the bases of the vessels, the vessels being partially filled with liquid, a supply pipe for each vessel connected with the upper portion of the vessel, a source of air or gas under pressure common to said supply pipes, an outlet pipe for each vessel connected with the upper portion of the vessel, an outlet conduit common to said outlet pipes, and independent valves in said supply and outlet pipes whereby said air or gas under pressure may be permitted to pass unobstructed by the liquid in the cylinders from the common supply to the common outlet or may have the liquid interposed at pleasure.

2. A meter comprising two closed vessels intercommunicating at their bases by a valved connection and partially filled with liquid, gages, one for each vessel, to determine the height of liquid therein, pressure gages one for each vessel to determine the pressure of air or gas therein, means for connecting the tops of the vessels with a common source of air or gas under pressure, means for connecting the tops of the vessel with a common outlet and valves for independently controlling the connections at the tops of the several vessels.

3. A meter for determining the amount of air or gas consumed by a pneumatic machine comprising a pair of closed cylinders connected at their bases by a pipe provided with a quick opening valve and partially filled with liquid gages for determining the height of the liquid in the cylinders, a supply pipe provided with branch pipes connected with the tops of the two cylinders, an outlet pipe provided with branch pipes connected with the tops of the cylinders, valves in the branch pipes, gages for determining the pressure of the air or gas in the cylinders and a reducing pressure valve located in the inlet pipe leading to the tops of the cylinders.

In testimony, that I claim the foregoing as my invention, I have signed my name in presence of two witnesses, this 30th day of April 1908.

ALBERT H. TAYLOR.

Witnesses:
RUSSELL H. WILHELM,
WARD RAYMOND.